(12) United States Patent
Bordes, Jr.

(10) Patent No.: US 6,357,170 B1
(45) Date of Patent: Mar. 19, 2002

(54) TERMITE BAIT COVER

(75) Inventor: Edgar S. Bordes, Jr., Metairie, LA (US)

(73) Assignees: New Orleans Building Corporation; The City of New Orleans, both of New Orleans, LA (US)

( * ) Notice: Subject to any disclaimer, the term of this patent is extended or adjusted under 35 U.S.C. 154(b) by 1 days.

(21) Appl. No.: 09/641,740

(22) Filed: Aug. 18, 2000

Related U.S. Application Data

(60) Provisional application No. 60/149,873, filed on Aug. 19, 1999.

(51) Int. Cl.$^7$ .................................................. A01M 1/10
(52) U.S. Cl. .......................................... 43/121; 43/124
(58) Field of Search ..................................... 43/121, 124

(56) References Cited

U.S. PATENT DOCUMENTS

| | | | | |
|---|---|---|---|---|
| 2,993,616 A | * | 7/1961 | Carlile, Jr. et al. ............ | 138/89 |
| 3,618,809 A | * | 11/1971 | Martino ....................... | 220/235 |
| 3,667,640 A | * | 6/1972 | Morrow ....................... | 220/235 |
| 4,760,868 A | * | 8/1988 | Saxon .......................... | 138/89 |
| 5,325,630 A | * | 7/1994 | Allenbaugh ................... | 49/62 |
| 5,560,394 A | * | 10/1996 | Jorgensen ..................... | 138/89 |
| 5,927,000 A | * | 7/1999 | Bordes, Jr. ................... | 43/124 |

* cited by examiner

*Primary Examiner*—Charles T. Jordan
*Assistant Examiner*—Jordan Lofdahl
(74) *Attorney, Agent, or Firm*—Michael D. Carbo, PLC; Michael D. CArbo; Ronald J. Ventola II

(57) ABSTRACT

A system for detecting and monitoring termite infestation includes cover assembly having top and bottom plates having axially aligned apertures and linked by a threaded bolt, and bore gasket disposed between the plates. Bottom plates have additional apertures. Top plates have protruding dimples with nonslip surface and coating, tapered apertures therethrough, and plugs or, alternatively, an essentially flat top surface and areas of reduced thickness. An alternative cover assembly includes a top having a top disc portion with an axially aligned aperture therethrough and protruding dimples with tapered apertures and a cylinder portion, axially disposed downward therefrom and having retaining ridges encircling its exterior surface and rows of teeth axially disposed upon its inner surface; and a bottom cup in the shape of a tapered cylinder having a bottom covering, the bottom cup having an axially aligned aperture therethrough, additional apertures, and teeth axially disposed on the exterior surface thereof.

16 Claims, 12 Drawing Sheets

TERMITE BAIT COVER

CROSS-REFERENCE TO RELATED APPLICATION

This application is a continuation-in-part of U.S. Provisional Application No. 60/149,873, filed Aug. 19, 1999. To the extent not otherwise contained herein, applicant incorporates by reference U.S. Provisional Application No. 60/149,873, a copy of which is attached hereto as Appendix A.

STATEMENT REGARDING FEDERALLY-SPONSORED RESEARCH OR DEVELOPMENT

Not applicable.

REFERENCE TO A MICROFICHE APPENDIX

Not applicable.

BACKGROUND OF THE INVENTION: FIELD OF THE INVENTION AND DESCRIPTION OF RELATED ART

The present invention relates to an improvement of the Tamper Resistant Bait Cover (U.S. Pat. No. 5,927,000 to Edgar S. Bordes, Jr.). Accordingly, applicant incorporates by reference the section of U.S. Pat. No. 5,927,000 entitled "Background of the Invention," including the description therein of the field of the invention, the related art, and the objects of the invention. Applicant also incorporates the section entitled "Summary of the Invention" and the drawings of U.S. Pat. No. 5,927,000.

Additional art related to the field of this invention includes U.S. Pat. No. 6,079,150 to Setikeas et al., which describes an insect-control system and method in the same general field as applicant's U.S. Pat. No. 5,927,000.

The termite bait cover assembly disclosed in Pat. No. 5,927,000 requires the removal of the termite bait cover to detect the presence or absence of the target insect. Removal of the termite bait cover disturbs the feeding process of termites and tends to drive the termites away from the baiting system.

It is an object of this invention to allow a termite bait station to be evaluated for presence or absence of termites and termite activity without removing the bait cover.

Apertures in the bottom plate or top plate of the termite bait cover allow termite activity to be detected by conventional and future technologies. Preferably, the top plate has apertures, the apertures tapering from the bottom surface of the top plate to smaller openings on the top surface of the top plate. Small raised ridges form dimples and preferably surround the small openings on the top surface of the top plate. The dimples reduce or prevent moisture and light intrusion and enhance the effectiveness of the termite baiting system. Because termite bait assemblies frequently are installed in sidewalks or streets, the dimples may be made slip resistant.

Non-invasive termite detection methodologies include detecting methane and carbon dioxide gases produced by termite activity. These gases can be detected by conventional technology, such as by a device that produces a color change or a detectable signal. Several other detection technologies require either invasive detection or non-invasive access through the bait cover. In addition to producing methane and carbon dioxide, feeding termites change the moisture content of the bait. Feeding activity can also trigger a detectable transmission or color changes that could be detected through the cover assembly and that indicate the presence of active termites. The bait cover according to the current invention can accommodate all these technologies. An additional object of the present invention is to enable or enhance transmission of signals through the bait cover and to provide physical access to the bait station without removing the bait cover.

The system according to the present invention permits diagnosing and monitoring termite activity without removing the termite bait cover. Openings in the top and bottom of the bait cover enhance and expedite the detection process.

Some detection equipment is operable through a thin layer of material but not through the full thickness of the top plate. Hence another object of this invention is to provide a top plate having an area of decreased plate thickness. Preferably, the top surface of the top plate will remain as flat as possible, with the area of decreased thickness being created by the removal of material from the bottom surface of the top plate.

Some detection methods may operate through material other than the material from which the top plate is constructed. For example, where the top plate is made primarily of metal, plastic or other nonmetallic materials can allow detection of light, heat, or other emissions that are not detectable through a solid metallic top plate. The same principle holds true of top plates made of nonmetallic materials, such as plastics. Accordingly it is another object of this invention to provide a top plate having one or more areas comprising a material that effectively passes a detection signal.

Some detection methods may operate only through an aperture—for example, inserting fiber-optic cameras for visual inspection of the termite bait. Thus, a further an object of this invention is to provide a top cover having apertures that may be left open or that may be covered or plugged by a material that allows detection without removal of the cover plate.

Removal of the top cover assembly disclosed in U.S. Pat. No. 5,927,000 is accomplished by loosening a bolt in the cover assembly. This removal method can be time-consuming, especially when several bait stations require servicing. Hence, a further object of this invention is to provide a termite bait cover that may be removed and reinstalled quickly, using quick-removal pry tool.

SUMMARY OF THE INVENTION

These and other objects of this invention are met by providing apertures through the top and/or bottom plates of a termite bait cover.

Preferably, the top surface of the top plate has detection apertures that taper from a larger cross sectional area at the bottom surface of the top plate to a smaller cross sectional area at a dimple at the top surface of the top plate. The tapering of the apertures in the top plate minimizes the entry of moisture and light if the apertures are left open. Preferably, plugs can be placed in the apertures to exclude light and moisture, said plugs being either removable or constructed of materials that allow the transmission of sound waves, radio waves, light, infared radiation, or other signals correlated with any physical change detected by conventional or future termite detection technologies, thus allowing termite monitoring while minimizing disturbance of termite feeding activity. A plug may be an item shaped from solid material manufactured before use, such as a conventional rubber test-tube stopper. A plug also may be a mass of a self-curing material such as caulk, silicone, rubber, or other material that may be applied to an aperture in uncured form and allowed to cure, thus sealing the aperture.

An improved bottom plate may be used alone in conjunction with the improved top plate. Use of the bottom plate of the present invention along with the top plate of U.S. Pat. No. 5,927,000 may provide a sufficient increase in detection that the top plate of the present invention need not be employed to achieve effective monitoring.

In another embodiment of the invention, a cover assembly has a top having a top disc portion and a cylinder portion axially disposed downward therefrom, the cylinder portion having at least one retaining ridge encircling the cylinder portion and disposed upon the exterior surface thereof, and the cover assembly also having a bottom cup in the shape of a tapered cylinder having a bottom covering, said bottom cup being matable within the cylinder portion to expand the retaining ridge, and said bottom cup having an exterior diameter that tapers inward from the bottom of the bottom cup to the top thereof, said cover assembly being placed in the opening to seal the opening.

The retaining ridge is adjusted by inserting the bottom cup into the top until the desired amount of circumference expansion of the retaining ridge has occurred by actuating a threaded bolt inserted through the top plate assembly and threaded into the bottom assembly, thus pulling the bottom cup into the top and pushing the retaining ridge tightly against the walls of the termite bait opening when the bolt is tightened.

Preferably, the threaded bolt has a flat head, is countersunk within the top disc of the top and has two depressions in the head to accept the tip of a spanner or snake-eye screwdriver. Alternatively, some other tamper-resistant means for turning the bolt head, or even an ordinary screwdriver, can be used to tighten or loosen the thread bolt. When the top plate assembly and the bottom plate assembly are pulled together tightly, the bolt may have to be loosened to allow a removal tool to pry the tension adjustable bait cover out of the hole.

In another embodiment, the top assembly has at least one row of teeth disposed axially along the interior surface thereof, and the bottom cup has at least one row of teeth disposed axially along the exterior surface thereof, said teeth on said top and said teeth on said bottom cup being interlockable so as to prevent relative axial motion between said top and said bottom cup.

Typical cover assemblies having at least one retaining ridge and a top and a bottom cup interlocking teeth range between one-half inch and six inches in diameter. Typical cover assemblies having at least one retaining ridge and a top and a bottom cup joined by a bolt range between from two inches to twelve inches in diameter.

The non-axially-aligned apertures utilized in the current invention must be placed so that detection is not compromised. For some detection methods, the rubber gasket or portions of other components used with the current invention would prevent termite monitoring if the gasket or component appeared in the sight line between the non-axially-aligned aperture in the top plate and the termite bait. Other detection methods are not affected by the presence of the rubber gasket or other component portion in the sight line.

DETAILED DESCRIPTION OF THE INVENTION

Figure 1:
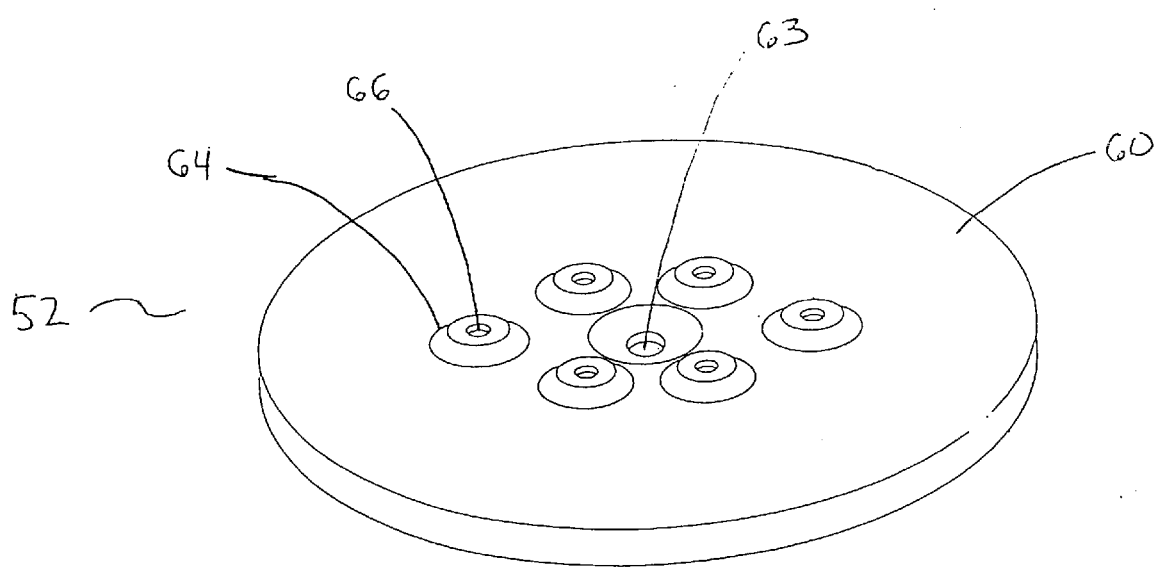
FIG. 1 is a perspective top view of an embodiment of a termite bait cover assembly top plate showing detection dimples.
Figure 2:
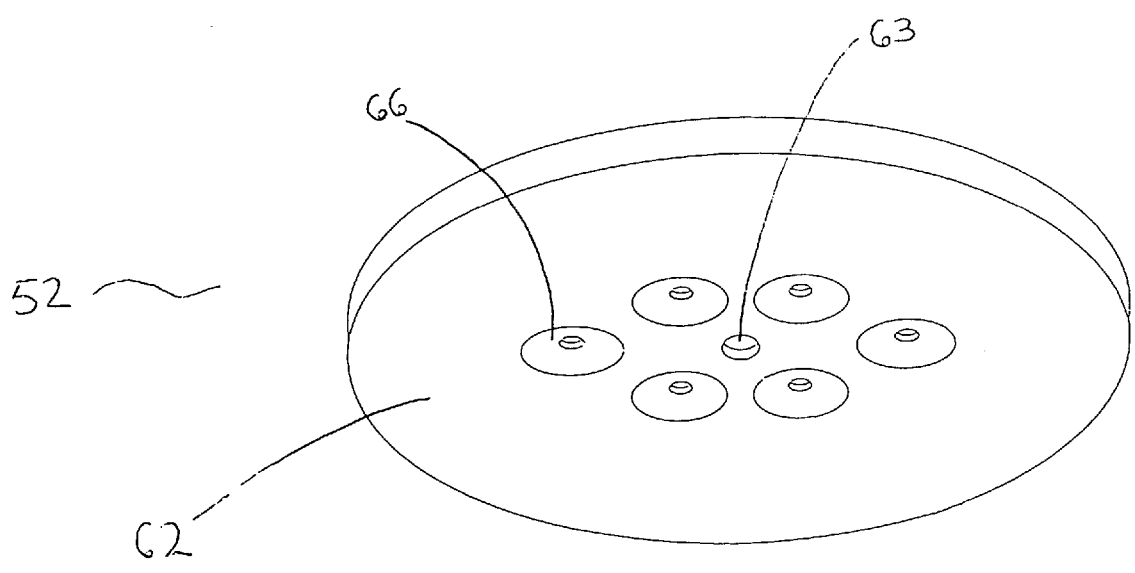
FIG. 2 is a perspective bottom view of an embodiment of a termite bait cover assembly top plate showing bottom exit holes of the detection dimples.

Referring to the drawing, where like parts are given like reference numerals, cover assembly 51 includes top plate 52, bottom plate 54, gasket 56, and bolt 58. Top plate 52 is preferably a flat circular plate having an axially aligned aperture 63 and a tapered edge. Bottom plate 54 is preferably a plumber's blank that has been shaped so that gasket 56 does not collapse when compressed between top plate 52 and bottom plate 54. Bottom plate 54 has axially aligned aperture 73 and is preferably of smaller diameter than top plate 52.

Gasket 56 is preferably a substantially cylindrical rubber bore gasket that is compressible along its longitudinal axis and, when compressed, expands circumferentially. Compression of gasket 56 between top plate 52 and bottom plate 54 is provided by bolt 58, which preferably is threaded in at least the portion that engages bottom plate 54 through central aperture 73.

Preferably, bolt 58 has a flat head, is countersunk within the top plate, and has two depressions in the head to accept the tip of a spanner or a snake-eye screwdriver. Alternatively, bolt 58 has a head that accepts other tamper resistant means for turning bolt 58 or that accepts an ordinary screwdriver.

Figure 3:
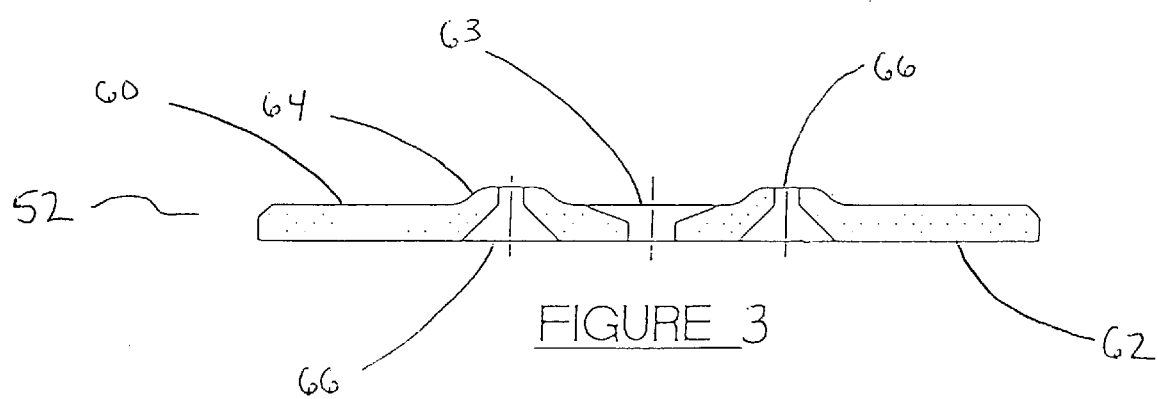
FIG. 3 is a cross sectional view through a top plate of an embodiment of a termite bait cover assembly showing tapered access holes through the top plate.
Figure 4:
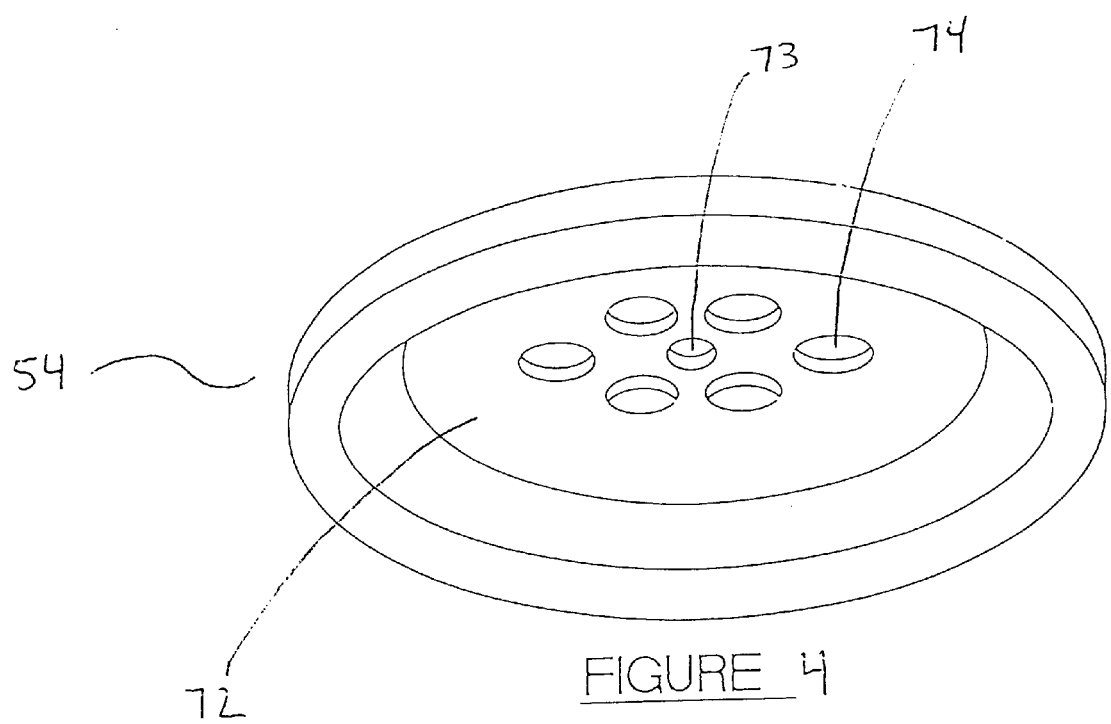
FIG. 4 is a perspective bottom view of an embodiment of a termite bait cover assembly bottom plate showing access holes through the bottom plate.
Figure 5:
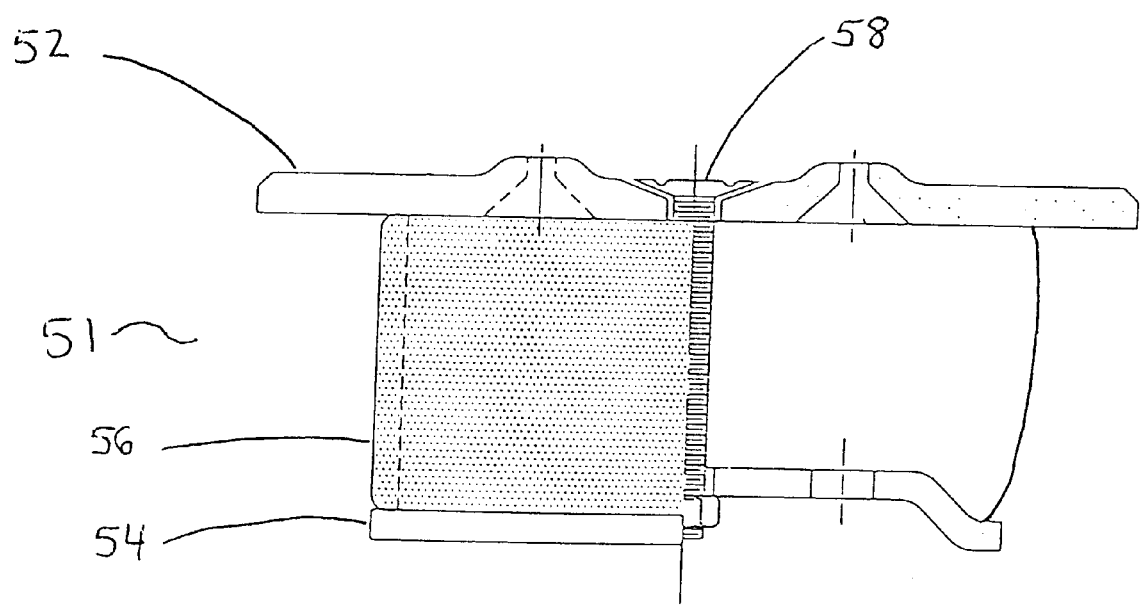
FIG. 5 is a broken away side view of an embodiment of a termite bait cover assembly showing a tapered aperture and a detector dimple in the top plate and also along an access hole in the bottom plate.
Figure 6:
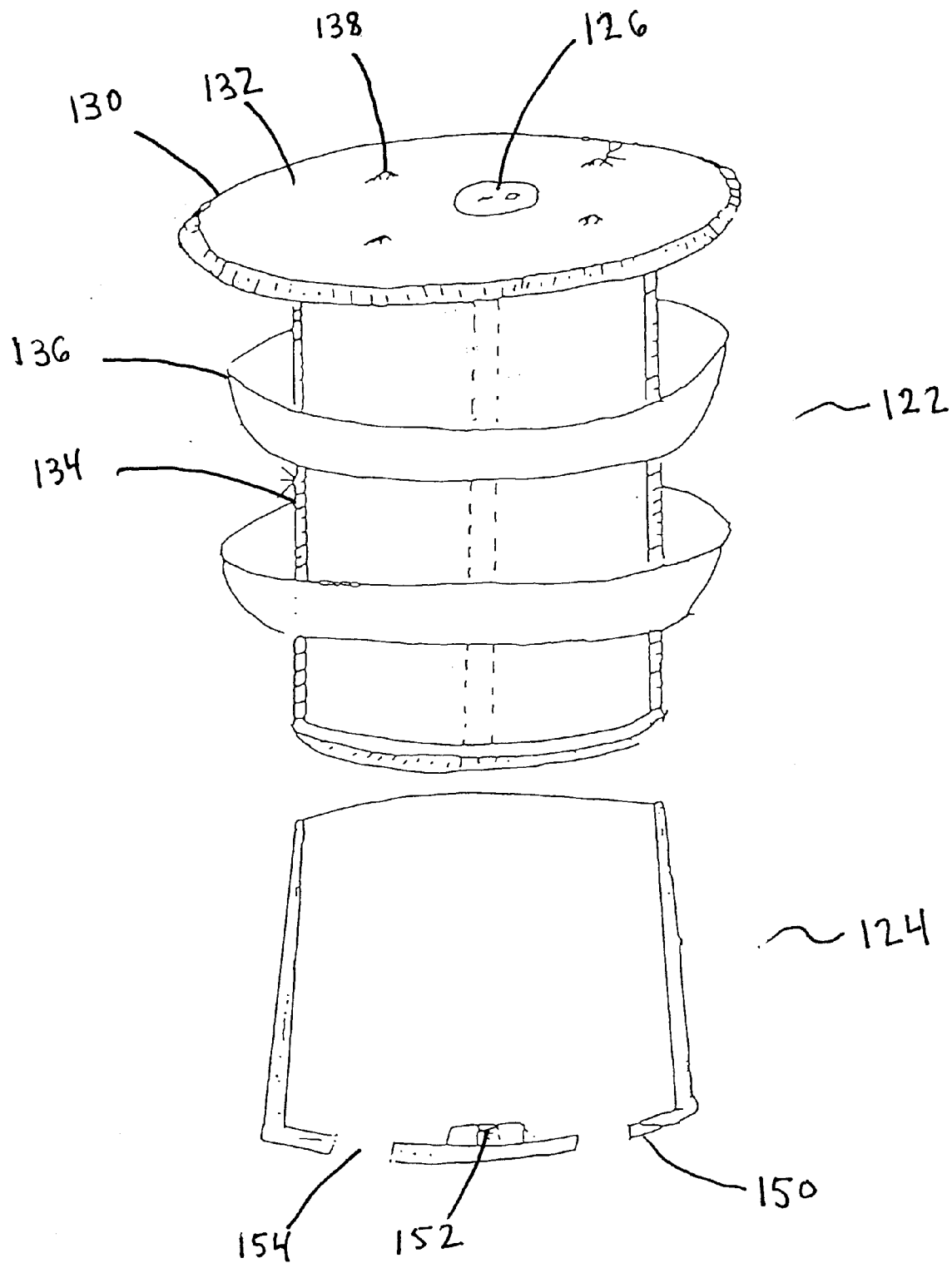
FIG. 6 is a side view of an embodiment of a termite bait cover assembly showing apertures of the bottom assembly.
Figure 7:
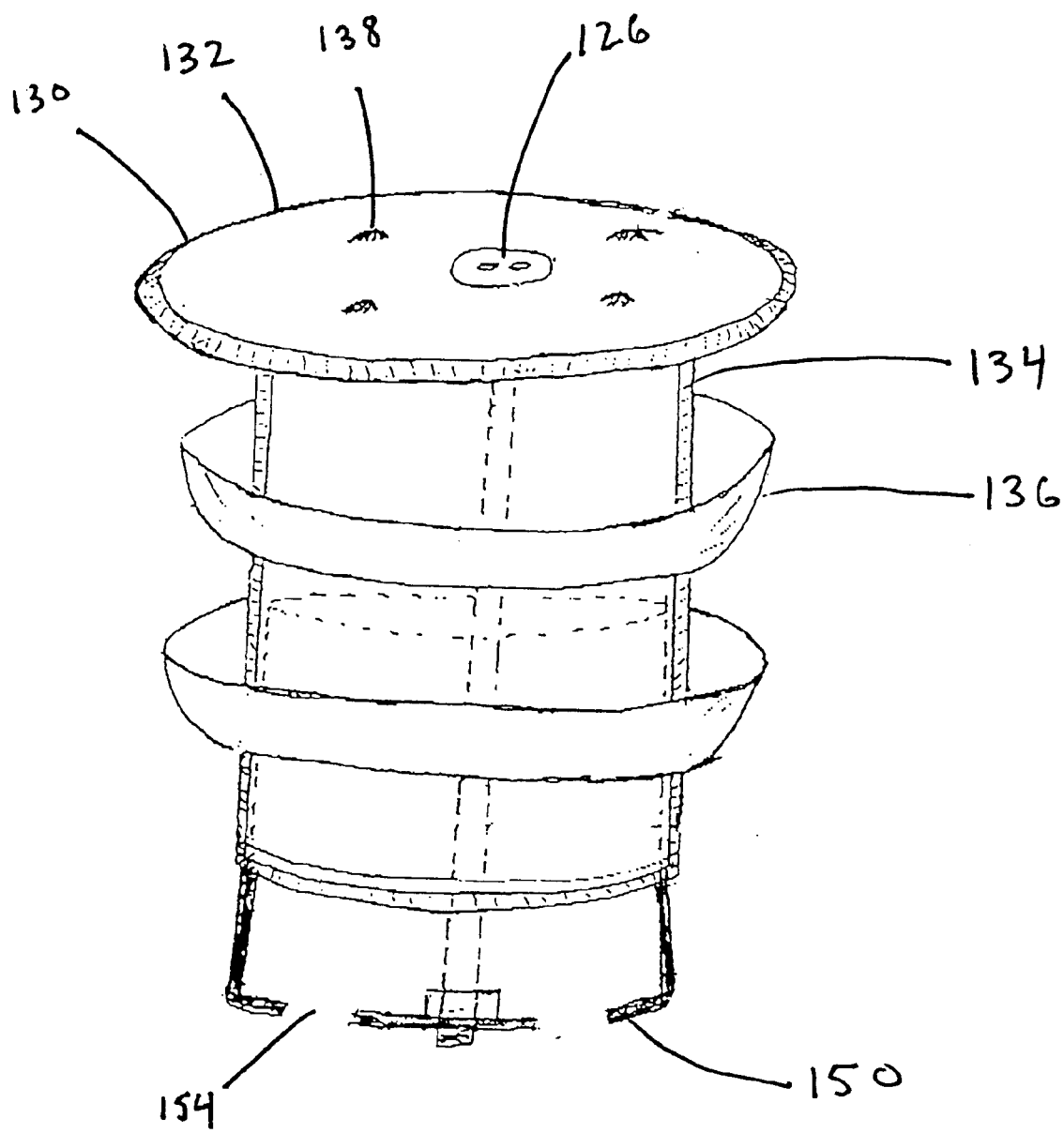
FIG. 7 is side view of an embodiment of a termite bait cover assembly showing the bottom assembly poised to be drawn into the downward projecting cylindrical tube of the top cover assembly.
Figure 8:
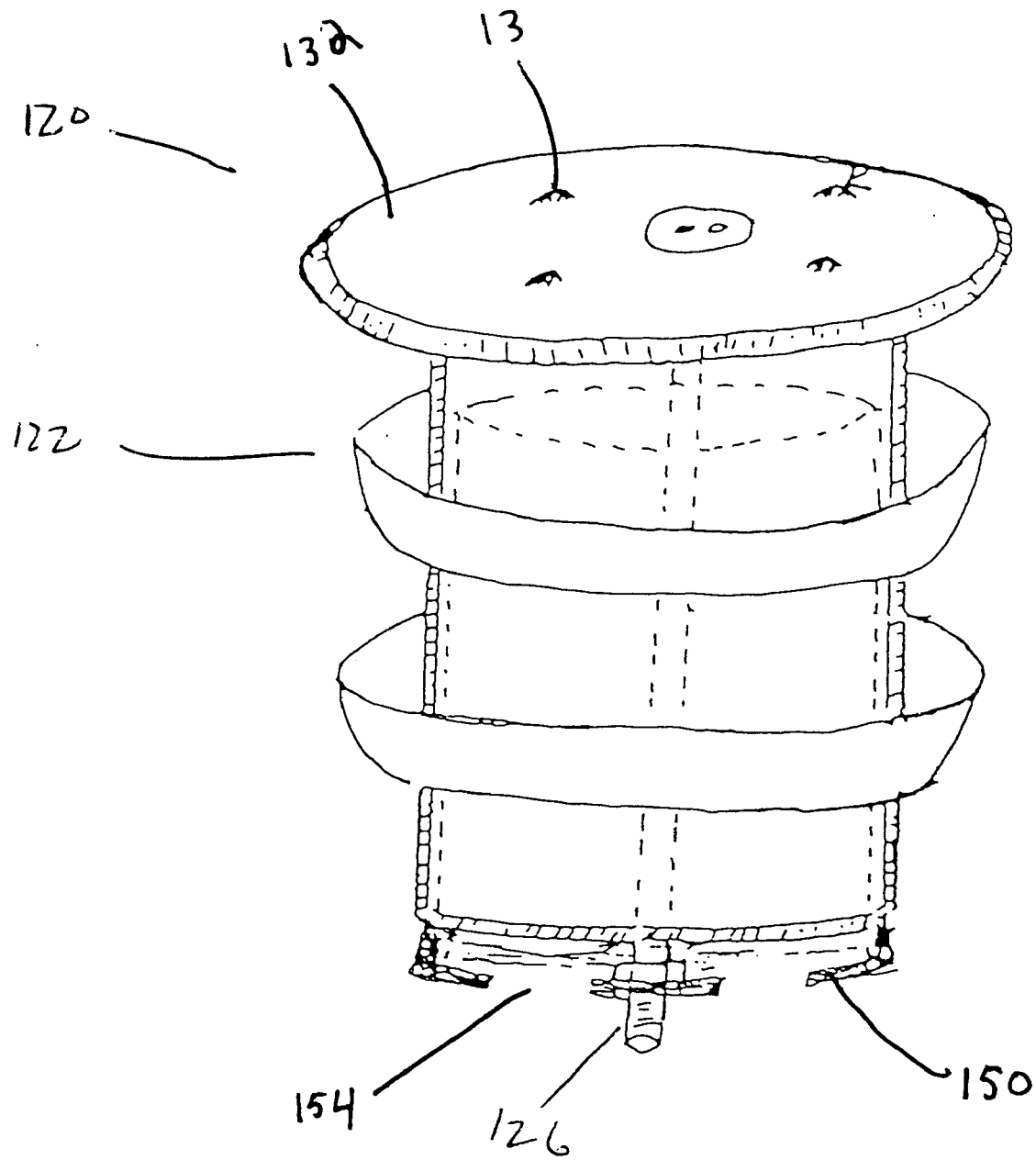
FIG. 8 is a side view of an embodiment of a termite bait cover assembly showing the bottom assembly drawn into the top cover assembly.
Figure 9:
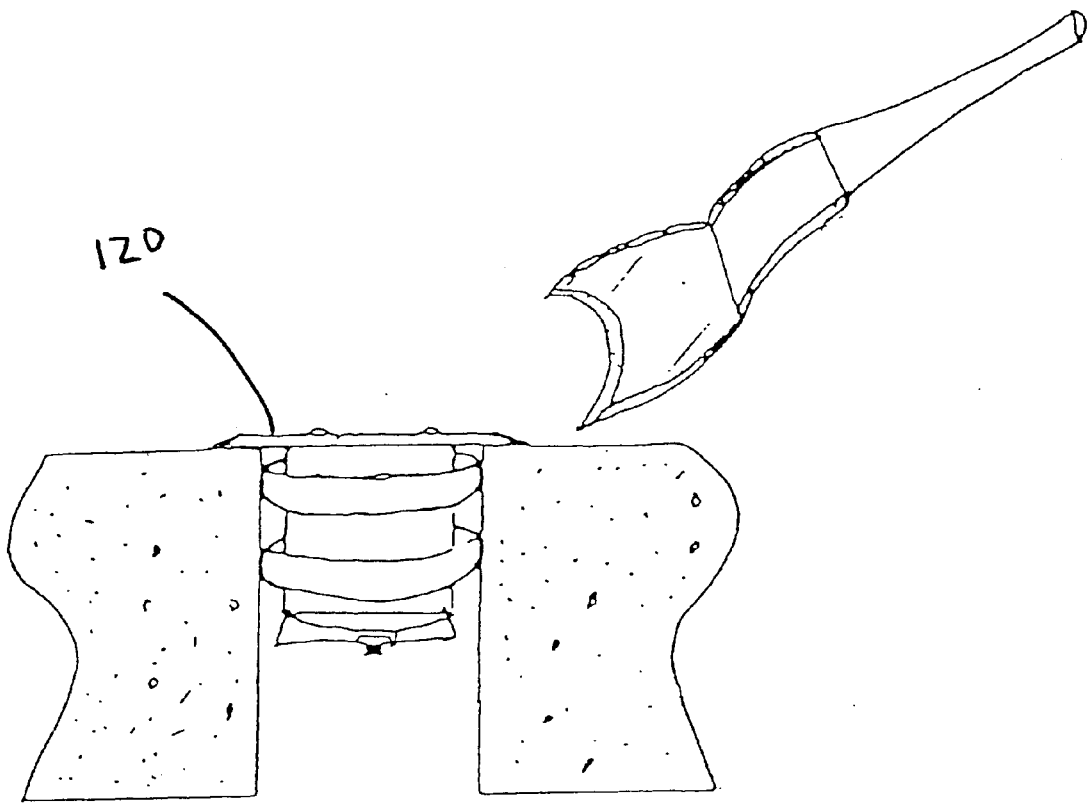
FIG. 9 is a broken away view of an embodiment of a termite bait cover assembly showing the assembly but not tensioned, and also showing an embodiment of a prying-removal prying tool.
Figure 10:
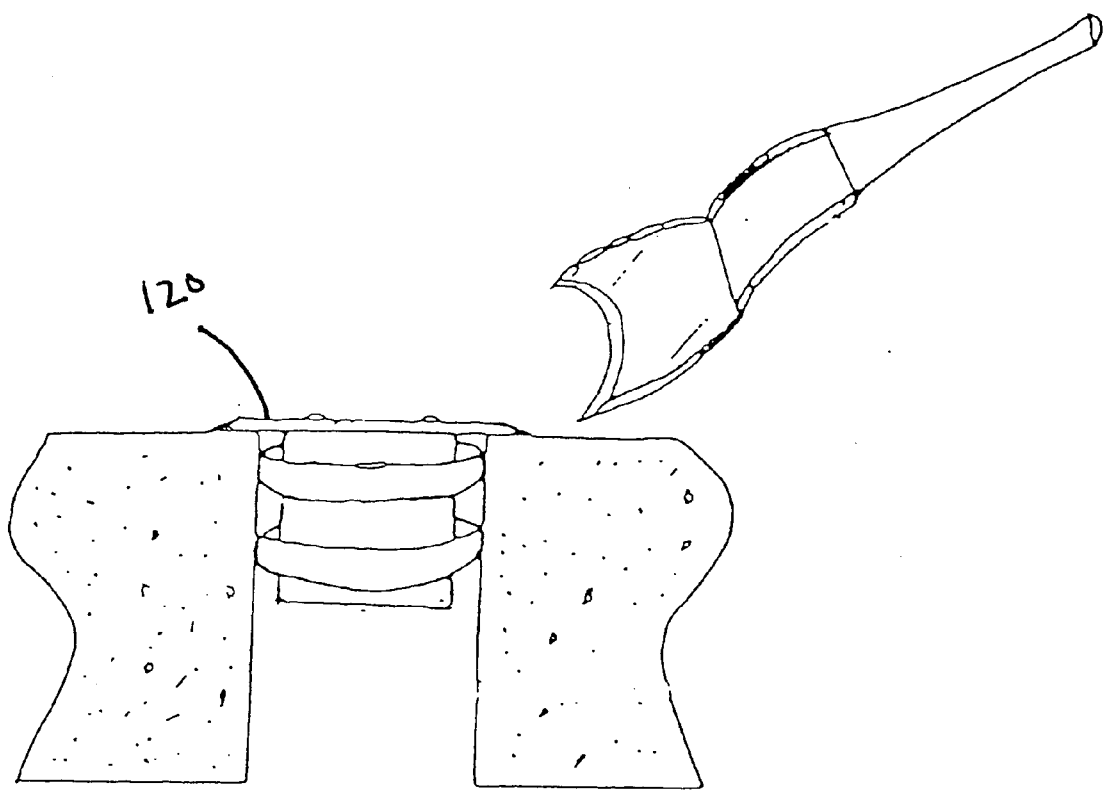
FIG. 10 is a broken away side view of an embodiment of a termite bait cover assembly, in place and tensioned, covering a bore hole, and also showing an embodiment of the leveraged quick-removal prying tool.
Figure 11:
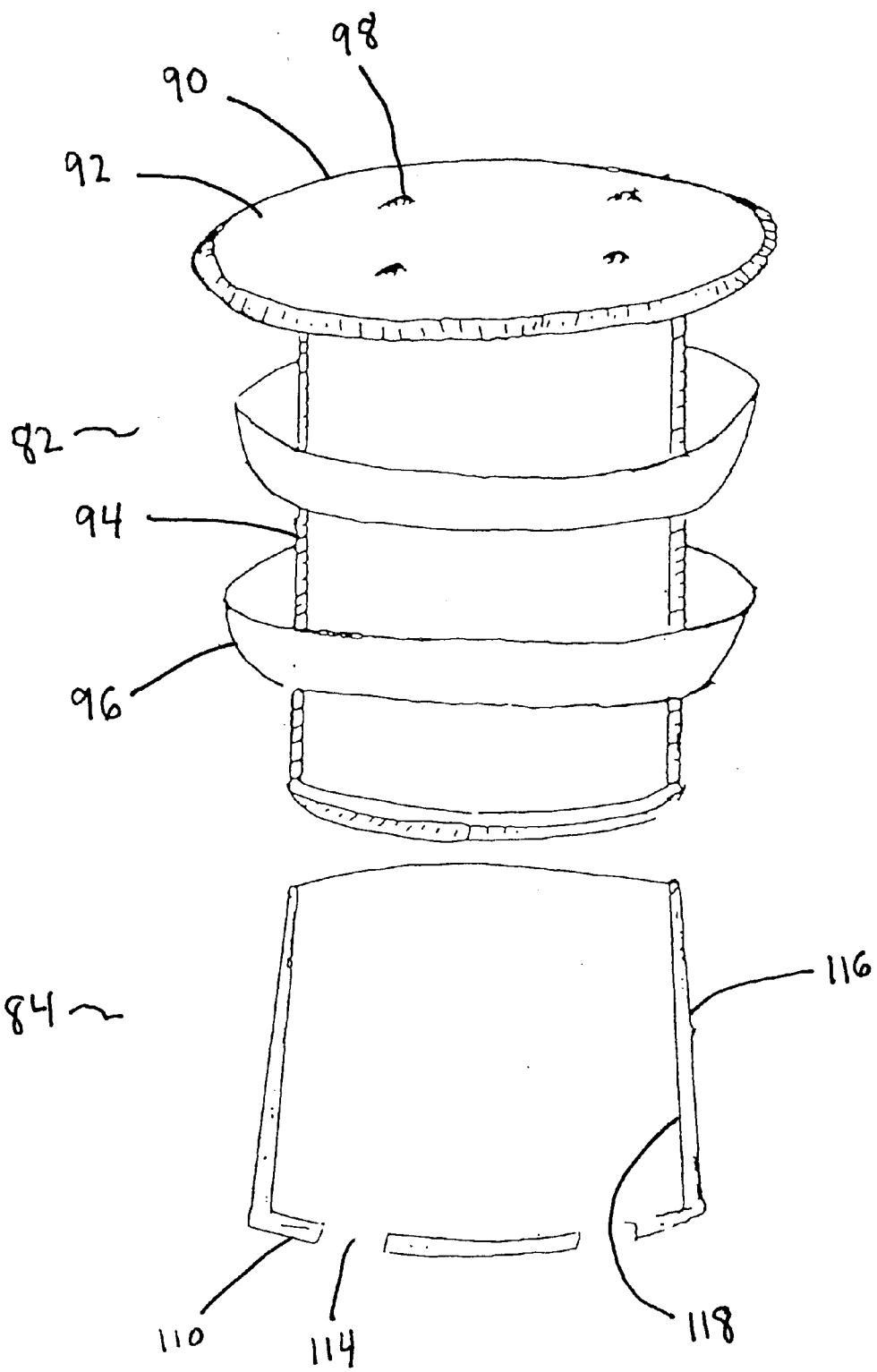
FIG. 11 is a side view of an embodiment of a termite bait cover assembly, showing a boltless, manually tensionable bait cover assembly.
Figure 12:
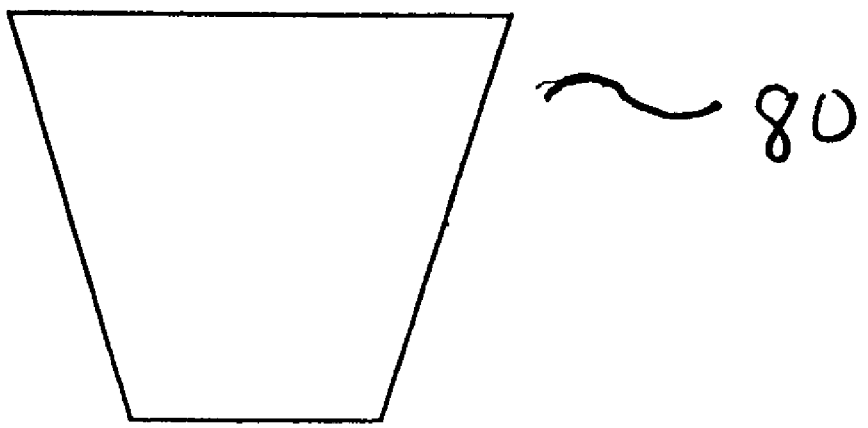
FIG. 12 is a side view of an embodiment of a plug for sealing a tapered aperture in the top surface of an embodiment of a termite bait cover assembly.
Figure 13:
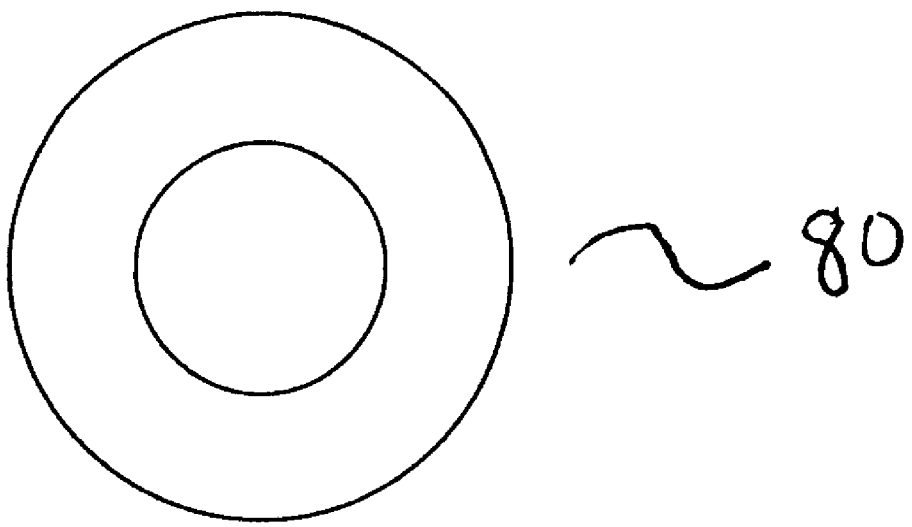
FIG. 13 is a bottom view of an embodiment of a plug for sealing a tapered aperture in the top surface of an embodiment of a termite bait cover assembly.

Top plate 52 has top surface 60, bottom surface 62, and axially aligned aperture 63. Preferably, axially aligned aperture 63 is centrally located in top surface 60. Detection dimples 64 protrude upward from top surface 60 of top plate 52. Additional Apertures 66 (also called dimple apertures) penetrates detection dimples 64 and bottom surface 62. As may be seen in cross section in FIG. 3, the cross sectional area of aperture 66 tapers from a larger cross sectional area at bottom surface 62 to a smaller cross-sectional area at top surface 60. Detection dimples 64 have a non-slip coating. Plugs 80 fit into detection dimples 64.

Bottom plate 54 has top surface 70, bottom surface 72, axially aligned aperture 73, and additional aperture 74.

Applicant incorporates by reference the section entitled "Description of the Preferred Embodiments" and the drawings of U.S. Pat. No. 5,927,000. The method of installation of the present invention is the same as that disclosed in U.S. Pat. No. 5,927,000. In accordance with the present invention, a termite bait station may be checked for termite activity without removing cover assembly 51 from the bait station. Instead, plug 80 may be left in place—or removed if necessary—and detection may proceed with the cover assembly 51 in place.

In another embodiment, cover assembly 81 has top 82 and bottom cup 84. Top 82 has top disc 90, top surface 92, cylinder portion 94, retaining ridges 96, detection dimples 98, axially aligned aperture 100, interior cylinder surface 102, additional apertures 114, teeth 106 disposed in rows, and slot 108. Bottom cup 84 has bottom covering 110, axially aligned aperture 112, additional apertures 114, exterior cylinder surface 116, interior cylinder surface 118, and teeth 122 disposed in rows.

This embodiment is used by inserting bottom cup 84 into top 82 until top 82 is elastically circumferentially stretched to the desired size and tension for the termite bait opening that is to be sealed. Preferably the tension selected is high enough to prevent tampering and low enough to allow for removal of the bait cover without undue wear or damage to the cover assembly 81. The bottom cup 84 is then twisted so as to interlock the teeth disposed upon top 82 and bottom cup 84, preventing relative axial motion between top 82 and bottom 84. The cover assembly 81 is then forced into the termite bait opening using the installer's foot or an appropriate insertion tool. Because the preferred embodiment includes detection dimples 98 and additional apertures 114, monitoring may be accomplished as described below in Examples 1 and 2. Removal of the cover assembly 81 may be accomplished by use of a prying tool, preferably a prying tool with a wide, curved edge that makes contact with a substantial length of the edge of the top disc. Such a prying tool reduces stress on the edge of the top disc and thus reduces the damage suffered by the top disc when the cover assembly is removed. In a preferred embodiment, at least one preferably axial slot 108 is provided to increase the flexibility of the top cylinder portion 94.

In another embodiment, cover assembly 120 has top 122, bottom cup 124, and bolt 126. Top 122 has top disc 130, top surface 132, cylinder portion 134, retaining ridges 136, detection dimples 138, and axially aligned aperture 140. Bottom cup 124 has bottom covering 150, axially aligned aperture 152, and additional apertures 154. In the preferred embodiment, at least one slot 108 is provided to increase the flexibility of the top cylinder portion 134.

This embodiment is used by inserting bottom cup 124 into top 122 and then actuating bolt 126 using a snake-eye screwdriver, spanner, or other appropriate tool until top 122 is elastically circumferentially stretched to the desired size and tension for the termite bait opening that is to be sealed. Preferably, the tension selected is high enough to prevent tampering and low enough to allow for removal of the bait cover without undue wear or damage to the cover assembly. Because this preferred embodiment includes detection dimple 138 and additional aperture 154, monitoring may be accomplished as described below in Examples 1 and 2. Removal of the cover assembly 120 may be accomplished by use of a prying tool, either with or without loosening the bolt. The prying tool preferably has wide, curved prying surface that makes contact with a substantial length of the edge of the top disc. Such a prying tool reduces stress on the edge of the top disc and thus reduces the damage suffered by the top disc when the cover assembly is removed.

As used herein, "structure" pavement, buildings, trees, or any other natural or man-made object in which a termite bait station can be placed.

EXAMPLE 1

Termite cover assembly 51, with top plate 60 preferably made of metal, is placed into an opening in a sidewalk, with plug 80 made of rubber placed in each aperture 66. When monitoring the termite bait station by means of gas detection, one plug 80 is removed and a probe is inserted into aperture 66 to sample the gases present within a bait station. The sample may be analyzed in conventional fashion. When sampling is complete, plug 80 is replaced in aperture 66.

EXAMPLE 2

Termite cover assembly 51, with top plate 60 preferably made of metal, is placed into an opening in a sidewalk, with plug 80 made of rubber placed in each aperture 66. When monitoring the termite bait station one or more plugs 80 are removed from dimples 66, and fiber-optic visual monitoring equipment is inserted through apertures 66 in top plate 52 and apertures 74 in bottom plate 54. When inspection is complete, plugs 80 are replaced in apertures 66.

EXAMPLE 3

Termite bait cover assembly 51 is placed into a termite bait station opening. The termite bait station contains an electronic device that monitors termite activity. In response to a signal from outside the termite bait station, the electronic device transmits a signal indicating whether the presence of termites has been detected. An embodiment of the present invention having additional apertures in the top plate, bottom plate, top disc and/or bottom cup allows successful transmission detection of the electronic signals at a lower power level and greater range than would be possible with the invention disclosed in U.S. Pat. No. 5,927,000.

The embodiments of the present invention of a system for detecting and monitoring termite infestation described above are set out by way of illustration but not of limitation. Many other embodiments which will be readily apparent to those skilled in the art may be made without materially departing from the spirit and scope of this invention.

What is claimed is:

1. A system for detecting and monitoring termite infestation, the system comprising:
   (a) a bait access opening through a structure or tree to a place of potential infestation;
   (b) bait material placed through the opening to the place of potential infestation;
   (c) a cover assembly for sealing the bait access opening formed through structure or tree, the cover assembly having a top plate having an axially aligned aperture therein, a bottom plate having an axially aligned aperture therein, a threaded bolt passing through the top plate axially aligned aperture and connecting to the bottom plate axially aligned aperture, the bolt being actuatable for reducing and extending the distance between the top plate and the bottom plate, and a bore gasket positioned between the top plate and the bottom plate, the gasket being axially compressible and circumferentially expandable as the distance between the top plate and the bottom plate is reduced, the cover assembly being placed in the opening to seal the opening; and
   (d) said bottom plate having at least one additional aperture therein, in addition to said axially aligned aperture, said additional aperture being disposed such that expansion of said gasket will not result in obstruction of said additional aperture.

2. A system for detecting and monitoring termite infestation, the system comprising:

(a) a bait access opening through a structure or tree to a place of potential infestation;

(b) bait material placed through the opening to the place of potential infestation;

(c) a cover assembly for sealing the bait access opening formed through the structure or tree, the cover assembly having a top plate having an axially aligned aperture therein, a bottom plate having an axially aligned aperture therein, a threaded bolt passing through the top plate aperture and connecting to the bottom plate aperture, the bolt being actuatable for reducing and extending the distance between the top plate and the bottom plate, and a bore gasket positioned between the top plate and the bottom plate, the gasket being axially compressible and circumferentially expandable as the distance between the top plate and the bottom plate is reduced, the cover assembly being placed in the opening to seal the opening; and (d) said top plate having at least one dimple protruding from the top surface of said top plate and having an aperture passing through each at least one dimple at least and said top plate, said aperture tapering from a larger cross sectional area at the bottom surface of said top plate to a smaller cross sectional area at the top surface of the at least one dimple.

3. A system for detecting and monitoring termite infestation according to claim 1, wherein said top plate has at least one dimple protruding from the top surface of said top plate and has an aperture passing through the at least one dimple and said top plate, said aperture tapering from a larger cross sectional area at the bottom surface of said top plate to a smaller cross sectional area at the top surface of the at least one dimple.

4. A system for detecting and monitoring termite infestation according to claim 1 or 2, wherein said dimple on said top surface of said top plate has a non-slip surface texture.

5. A system for detecting and monitoring termite infestation according to claim 1 or 2, wherein said dimple on said top surface of said top plate has a non-slip surface coating.

6. A system for detecting and monitoring termite infestation according to claim 1, wherein said top plate has an essentially flat top surface and said top plate has one or more areas of reduced thickness.

7. A system for detecting and monitoring termite infestation according to claim 1, wherein said top plate has at least one additional aperture therein, in addition to said axially aligned aperture.

8. A system for detecting and monitoring termite infestation according to claim 7, wherein said aperture tapers from a larger cross sectional area at the bottom surface of said top plate to a smaller cross sectional area at the top surface of said top plate.

9. A system for detecting and monitoring termite infestation according to claim 7 or 8, further comprising:

a plug placed into said at least one additional aperture in said top plate.

10. A system for detecting and monitoring termite infestation according to claim 9, wherein the at least one plug comprises material that allows detection of termite activity while the plug is in place.

11. A system for detecting and monitoring termite infestation, the system comprising:

(a) a bait access opening through a structure or tree to a place potential infestation;

(b) bait material placed through the opening to the place of potential infestation;

(c) a cover assembly for sealing the bait access openings formed through the structure or tree, said assembly comprising a top having a top disc portion and a cylinder portion axially disposed downward therefrom, and the cylinder portion having at least one retaining ridge encircling the cylinder portion and disposed upon the exterior surface thereof, and a bottom cup in the shape of a tapered cylinder having a bottom covering, said bottom cup being matable within the cylinder portion of the top to expand the retaining ridge, and said bottom cup having an exterior diameter that tapers inward from the bottom of the bottom cup to the top thereof, said cover assembly being placed in the opening to seal the opening.

12. A system for detecting and monitoring termite infestation according to claim 11, wherein said top disc of said top has an axially aligned aperture therein, said bottom covering of said bottom cup has an axially aligned aperture therein, and said cover assembly has a threaded bolt passing through the axially aligned aperture of the top of said cover assembly and connecting to the axially aligned aperture of the bottom cup, said bolt being actuatable for reducing and extending the distance between the top and the bottom covering of the bottom cup.

13. A system for detecting and monitoring termite infestation according to claim 11 or 12, wherein said bottom covering of said bottom cup has one or more additional apertures.

14. A system for detecting and monitoring termite infestation according to claim 11 or 12, wherein said top disc has at least one dimple protruding from the top surface of said top disc and has a dimple aperture passing through each at least one dimple and through the bottom surface of said top disc, said dimple aperture tapering from a larger cross sectional area at the bottom surface of said top disc to a smaller cross sectional area at the top surface of the at least one dimple.

15. A system for detecting and monitoring termite infestation according to claim 11, wherein said cylinder portion has at least one row of teeth disposed axially along the interior surface thereof, said bottom cup has at least one row of teeth disposed axially along the exterior surface thereof, said teeth on said cylinder portion and said teeth on said bottom cup being interlockable so as to prevent relative axial motion between said top and said bottom cup.

16. A system for detecting and monitoring termite infestation according to claim 11, wherein said cylinder of said top has one or more slots therein.

* * * * *